US009593903B1

(12) United States Patent
Sanchez

(10) Patent No.: US 9,593,903 B1
(45) Date of Patent: Mar. 14, 2017

(54) BOW AND ARROW HUNTING ACCESSORY DEVICE

(71) Applicant: Pedro Sanchez, Coral Gables, FL (US)

(72) Inventor: Pedro Sanchez, Coral Gables, FL (US)

( * ) Notice: Subject to any disclaimer, the term of this patent is extended or adjusted under 35 U.S.C. 154(b) by 0 days.

(21) Appl. No.: 15/276,430

(22) Filed: Sep. 26, 2016

(51) Int. Cl.
    *F41B 5/14*    (2006.01)
    *G01P 13/02*    (2006.01)
    *F16M 13/02*    (2006.01)
    *A01M 31/00*    (2006.01)

(52) U.S. Cl.
    CPC ........... *F41B 5/1453* (2013.01); *A01M 31/00* (2013.01); *F16M 13/02* (2013.01); *G01P 13/02* (2013.01)

(58) Field of Classification Search
    CPC ...... F41B 5/1453; A01M 31/00; F16M 13/02; G01P 13/02
    USPC .... 211/85.7; 248/125.7, 125.9, 219.3, 224.7, 248/289.11, 289.31, 290.1, 296.1
    See application file for complete search history.

(56) References Cited

U.S. PATENT DOCUMENTS

| | | | | |
|---|---|---|---|---|
| 1,759,314 A | * | 5/1930 | Kinquist | .................. E01F 9/65 248/145 |
| 4,284,095 A | * | 8/1981 | Norton | .................. A45B 25/14 135/21 |
| 5,482,241 A | * | 1/1996 | Oglesby | .................. F41B 5/14 124/23.1 |
| 5,725,106 A | | 3/1998 | Wilson | |
| 5,811,673 A | * | 9/1998 | Kwok | .................. G01P 13/02 116/265 |
| 6,575,482 B2 | | 6/2003 | Dombroskie et al. | |
| 6,726,162 B1 | | 4/2004 | Winter | |
| 6,726,163 B2 | * | 4/2004 | Eppard | ............... A01M 31/025 182/87 |
| 6,948,690 B1 | * | 9/2005 | Sandel | ...................... F41B 5/14 124/86 |
| 7,484,699 B1 | | 2/2009 | Ziegler et al. | |
| 7,614,592 B2 | | 11/2009 | Bean et al. | |
| 7,857,279 B2 | | 12/2010 | Krasnicki | |
| 7,861,987 B2 | * | 1/2011 | Gorsuch | ................. F41A 23/18 124/86 |
| 7,958,663 B2 | * | 6/2011 | Saunders, III | ........ F41C 33/001 211/64 |
| 8,061,341 B2 | | 11/2011 | Hudkins | |
| 8,231,095 B2 | * | 7/2012 | Bean | ...................... F41A 23/18 248/316.8 |

(Continued)

FOREIGN PATENT DOCUMENTS

CA                   2272507 A1     11/2000
DE                 20119612 U1 *    2/2002  ........... A01M 31/00

*Primary Examiner* — Korie H Chan
(74) *Attorney, Agent, or Firm* — Albert Bordas, P.A.

(57) ABSTRACT

A bow and arrow hunting accessory device having a mounting post assembly with a sidewall, and mounting screws that insert into a tree. Further having a swivel bar assembly, and a mounting arm assembly with an accessory support arm to support a hunting bow. The mounting post assembly further has a shaft. The swivel bar assembly has a housing with a hole. The hole receives the shaft when the swivel bar assembly mounts onto the mounting post assembly. The swivel bar assembly has an elongated housing with extension holes. The mounting arm assembly has a mounting arm having an actuating pin. The elongated housing receives the mounting arm, and any of the extension holes receives the actuating pin. The mounting arm assembly has a wind vane. Further having a clamp assembly that secures an umbrella.

13 Claims, 3 Drawing Sheets

(56) References Cited

U.S. PATENT DOCUMENTS

| | | |
|---|---|---|
| 8,424,645 B2 | 4/2013 | Schlipf |
| 8,882,070 B2 | 11/2014 | Bean et al. |
| D741,438 S | 10/2015 | Wright, III |
| 2002/0036007 A1* | 3/2002 | Sellers .................. E04H 15/001 135/90 |
| 2009/0078500 A1 | 3/2009 | Wydner et al. |
| 2012/0104196 A1 | 5/2012 | Regina |

* cited by examiner

BOW AND ARROW HUNTING ACCESSORY DEVICE

BACKGROUND OF THE INVENTION

1. Field of the Invention

The present invention relates to hunting accessories, and more particularly, to bow and arrow hunting accessory devices.

2. Description of the Related Art

Applicant believes that one of the closest references corresponds to U.S. Patent Application Publication No. 20120104196 A1, published on May 3, 2012 to Nick Regina for an adjustable bow and arrow holder for a tree stand. However, it differs from the present invention because Regina teaches an adjustable holder for a hunter's tree stand that provides support for various bow sizes. The holder comprises a mounting plate, a bow support arm pivotally attached to the mounting plate to be moveable in discrete increments, a locking plate being slidably mounted in relation to the support arm, a biasing member to bias the locking plate relative to the bow support arm and releasably engage slots located in the mounting plate to provide the incremental movement, and upper and lower bow retaining members. To provide vertical adjustability, an extendable arm is provided and telescopes outward from the bow support aim, and upon which is mounted the upper bow retaining member. Further adjustability is accomplished with the lower bow support member, which may comprise a shaft with a knob disposed upon one end, being pivotally secured to a crank arm that is then pivotally secured to the bow support aim.

Applicant believes that another reference corresponds to U.S. Patent Application Publication No. 20090078500 A1, published on Mar. 26, 2009 to John Wydner, et al. for a safety tether anchor. However, it differs from the present invention because Wydner, et al. teaches a safety tether anchor that includes a base for mounting to a tree or other support. The base is securely connected to the support. The safety tether anchor includes a pig tail for attaching a safety harness tether to a support arm of the safety tether anchor. The pig tail can be slidably connected to the support arm so the pig tail can move inwardly or outwardly relative to the vertical support. A pivot arm can also be connected to the support arm, and the pivot arm can be used to hold a wide variety of items.

Applicant believes that another reference corresponds to U.S. Pat. No. 8,882,070 B2 issued to Ron M. Bean, et al. on Nov. 11, 2014 for a device and method for securing a bow. However, it differs from the present invention because Bean, et al. teaches a device and method for securing a bow while hunting. The device generally includes a base, a support arm rotatably mounted to the base, a connecting arm connected to the support arm, and a retaining arm rotatably connected to the connecting arm and mounted for rotation between an open position and a closed position to secure the limb of the bow. The support arm acts as a lever arm wherein the weight of the bow causes the connecting arm to move and the retaining arm to rotate from an open position to a closed position to secure the limb of the bow.

Applicant believes that another reference corresponds to U.S. Pat. No. 8,424,645 B2 issued to Jared S. Schlipf on Apr. 23, 2013 for a treestand bow holder and related method of use. However, it differs from the present invention because Schlipf teaches a treestand including a support platform that defines a bow holder hole within which a cam post is located. The bow holder hole accommodates a cam and/or a limb of a compound archery bow inserted therein. The cam post projects at least partially through the cam while a limb of the compound archery bow rests on a forward edge of the bow holder and/or a forward edge of the support platform to generally support the compound archery bow in an upright position, ready for use by an archer.

Applicant believes that another reference corresponds to U.S. Pat. No. 8,061,341 B2 issued to Jason M. Hudkins on Nov. 22, 2011 for an archery bow quiver. However, it differs from the present invention because Hudkins teaches an archery bow quiver for holding arrows for quick retrieval to be shot by the bow that includes an integral bow hook and tree screw. The quiver, which quickly attaches and detaches to the riser of a bow, includes an elongate frame with a top end for a hood to protect the arrow tips or broadheads and a bottom end where at is suitably an elastomeric arrow shaft rack. In the central region of the elongate frame is a first cutout into which a pivotal collar or bushing is secured for acceptance of a journaled shaft further extending into a tree screw or spike. The journaled shaft is threaded into a bow hook end, which extends in opposite direction from the tree screw. The bow hook and integral tree screw readily pivot within the cutout space to rotate transversely with respect to the elongate frame for rotation of the bow hook to screw the tree screw into suitably a tree. The bow hook suitably has a detent at its end for releasable locking engagement with a detent pin within the elongate frame suitably at a second cut out.

Applicant believes that another reference corresponds to U.S. Pat. No. 7,861,987 B2 issued to Timothy M. Gorsuch, et al. on Jan. 4, 2011 for hunting accessory holding devices. However, it differs from the present invention because Gorsuch, et al. teaches a device for holding archery bows and/or other hunting accessories. The hunting accessory holding device includes a base member that attaches to a mounting substrate such as a tree, an arm assembly that is configured to hold the archery bow, and a lift mechanism that connects the arm assembly to the base member. The lift mechanism automatically retracts the arm assembly upwardly, from an extended position to a retracted position, when the bow is removed from the arm assembly, thereby removing the arm assembly from the hunter's view and way. The lift mechanism can include a spring that provides a retracting force for moving the arm assembly. As desired, the lift mechanism can also provide an adjustable or variable braking force that opposes the retracting force and enables the hunter to determine a rate of arm retraction, as desired.

Applicant believes that another reference corresponds to U.S. Pat. No. 7,857,279 B2 issued to David A. Krasnicki on Dec. 28, 2010 for a bow holder and bow cradle. However, it differs from the present invention because Krasnicki teaches a bow holder comprised of a bow cradle, at least one extension member and a base. The bow cradle is comprised of a body, a guide and a limb rest. The guide receives and holds the limb of a bow and is attached to the top of the body. The limb rest is comprised of a pair of extension arms pivotally attached to the body, upright arms projecting from each extension arm and a stop. The extension arms and upright arms securely hold the lower limb and cam of a bow. The base is comprised of a stem for insertion into a ground surface and a pair of pedals for applying ground insertion force to the stem. The bow cradle is attached to the base, or if a higher bow holding position is desired, an extension member.

Applicant believes that another reference corresponds to U.S. Pat. No. 7,614,592 B2 issued to Ron M. Bean, et al. on Nov. 10, 2009 for a device and method for securing a bow. However, it differs from the present invention because Bean, et al. teaches a device and method for securing a bow while hunting. The device generally includes a base, a support arm rotatably mounted to the base, a connecting arm connected to the support arm, and a retaining arm rotatably connected to the connecting arm and mounted for rotation between an open position and a closed position to secure the limb of the bow. The support arm acts as a lever arm wherein the weight of the bow causes the connecting arm to move and the retaining arm to rotate from an open position to a closed position to secure the limb of the bow.

Applicant believes that another reference corresponds to U.S. Pat. No. 7,484,699 B1 issued to Rick Lee Ziegler, et al. on Feb. 3, 2009 for a support for hunting implements and accessories. However, it differs from the present invention because Ziegler, et al. teaches a tubular staff that has sections, which can be collapsed one into the other. The sections are held together by peripheral clamps snap-tightened by a small lever. There is a ground spike at the bottom of the staff, which can be removed and stowed within the staff. A firearm cradle can be on top and one end of a small elbowed rod goes either into the top of the staff or into the cradle, if one's there. The rod's other end attaches to a hole in a hunting bow to support it until game arrives. Instead of the elbowed rod, an accessory supporting structure can likewise be set into the staff or cradle. The linkage of the accessory support is a bendable length of ball and socket joints available from certain industrial sources so that the camera angle or telescope can be properly manipulated.

Applicant believes that another reference corresponds to U.S. Pat. No. 6,726,162 B1 issued to Arnold Winter on Apr. 27, 2004 for a bow holder. However, it differs from the present invention because Winter teaches an apparatus for holding a bow in a position to be used with minimal movement required by a user. The apparatus comprises an elongated rod being formed of a predetermined material and consisting of at least one section. A connection member is engageable with a first end of the elongated rod for securing the elongated rod to a tree. The apparatus includes a hook like member and a means disposed at a second end of said elongated rod for enabling said hook like member to be rotatably engaged therein with a second end of said elongated rod.

Applicant believes that another reference corresponds to U.S. Pat. No. 6,575,482 B2 issued to Daniel F. Dombroskie, et al. on Jun. 10, 2003 for a pull cart. However, it differs from the present invention because Dombroskie, et al. teaches a pull cart for removably securing and transporting an elongate object. The pull cart includes a frame, a pair of spaced-apart wheels rotatably attached to the frame, a handle attached to the frame and an elongate object holder. The elongate object holder includes a first finger, a second finger and a third finger. The first finger and the second finger are arranged as a pair of spaced-apart fingers and are located on the opposite sides of the elongate object. The third finger is longitudinally spaced from the first finger and the second finger. The elongate object holder also includes a tension spring adapted to move at least one of the first finger and the second finger relatively closer to the elongate object so that the first finger, the second finger and the third finger are each in contact with the elongate object and the elongate object is removably held onto the pull cart. The pull cart is especially useful for transporting a bow on a 3D archery course or for transporting a rifle or a shotgun while hunting. A number of accessories may be attached to the pull cart.

Applicant believes that another reference corresponds to U.S. Pat. No. 5,725,106 A issued to William J. Wilson on Mar. 10, 1998 for a rack apparatus for compound bows. However, it differs from the present invention because Wilson teaches a rack apparatus for holding and supporting compound bows that includes a horizontal holding element rectangular in configuration and secured to a base element which is of the same configuration. The rack apparatus is padded for protecting the compound bows stored therein. The rack apparatus may be used in the field as well as in a vehicle and in a storage environment.

Applicant believes that another reference corresponds to U.S. Pat. No. 5,482,241 A issued to Harvey D. Oglesby on Jan. 9, 1996 for an archery bow support. However, it differs from the present invention because Oglesby teaches an archery bow support for supporting an archery bow in an upright position when attached to an upstanding support. The archery bow support includes a bow holder, which defines a bow receptacle and a bow passage leading into the bow receptacle for retaining the bow in an upright position. The bow receptacle is larger than the depth of the bow's handgrip for retaining the bow within the bow holder. The bow holder passage is smaller than the depth of the handgrip while being larger than the width of the handgrip. A mount brace mounts the bow support to an associated structure.

Applicant believes that another reference corresponds to U.S. Pat. No. D741438 S issued to Ernest William Wright, III on Oct. 20, 2015. However, it is for an ornamental design of a compact crossbow holder for a tree stand that is different from the present invention.

Applicant believes that another reference corresponds to Canadian Patent No. CA 2272507 A1 issued to Daniel A. Ducharme, et al. on Nov. 21, 2000 for a multifunctional bow holder. However, it differs from the present invention because Ducharme, et al. teaches a multifunctional bow holder suitable to support the bow either on the ground, tied to a tree or affixed to a tree stand.

Other patents describing the closest subject matter provide for a number of more or less complicated features that fail to solve the problem in an efficient and economical way. None of these patents suggest the novel features of the present invention.

SUMMARY OF THE INVENTION

The present invention is a bow and arrow hunting accessory device, comprising a mounting post assembly comprising a sidewall, and first and second mounting screws that insert into a tree. Further comprising a swivel bar assembly, and a mounting arm assembly comprising at least one accessory support arm to support a hunting bow.

The first mounting screw extends from the sidewall and is stationary. The sidewall extends between first and second ends, and the mounting post assembly further comprises a top at the first end. The mounting post assembly further comprises a shaft that extends from the top.

The swivel bar assembly comprises a housing having a hole. The hole receives the shaft when the swivel bar assembly mounts onto the mounting post assembly. The swivel bar assembly comprises an elongated housing. The swivel bar assembly comprises at least two extension holes. The swivel bar assembly comprises a first end.

The mounting arm assembly comprises a mounting arm having a second end. The mounting arm comprises at least one actuating pin. The elongated housing receives the mounting arm. Each of the at least two extension holes receives the at least one actuating pin. The mounting arm assembly comprises a wind vane. In a preferred embodiment, the wind vane is mounted approximately perpendicularly to the mounting arm assembly.

Further comprising a clamp assembly. The clamp assembly comprises a clamp base and at least two hooks extending therefrom. The clamp assembly further comprises a clamp base hole to receive a fastener. The at least two hooks contain an umbrella when biased against the swivel bar assembly.

It is therefore one of the main objects of the present invention to provide a bow and arrow hunting accessory device.

It is another object of the present invention to provide a bow and arrow hunting accessory device that is removably mounted onto tree trunks.

It is another object of the present invention to provide a bow and arrow hunting accessory device that safely and conveniently keeps hunting equipment while hunting.

It is another object of the present invention to provide a bow and arrow hunting accessory device that protects a hunter from sun and/or rain.

It is another object of the present invention to provide a bow and arrow hunting accessory device that improves shooting accuracy with use of a wind vane.

It is another object of the present invention to provide a bow and arrow hunting accessory device that telescopically extends and retracts.

It is another object of the present invention to provide a bow and arrow hunting accessory device that may be adjusted and fixed at desired angles.

It is another object of the present invention to provide a bow and arrow hunting accessory device that is volumetrically efficient for carrying, transporting, and storage.

It is another object of the present invention to provide a bow and arrow hunting accessory device that can be readily assembled and disassembled without the need of any special tools.

It is another object of the present invention to provide a bow and arrow hunting accessory device, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
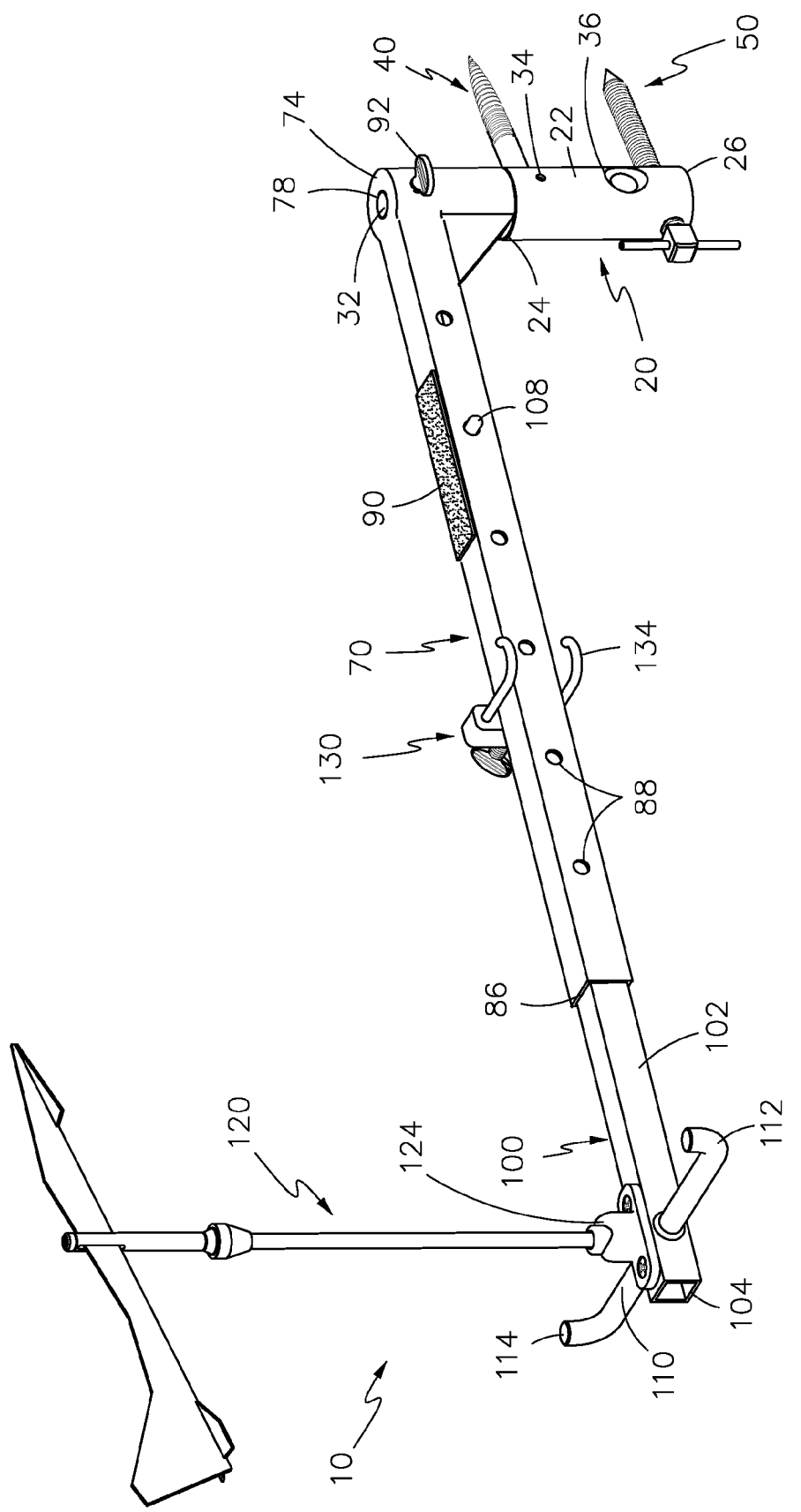
FIG. 1 represents an isometric view of the present invention.

Referring now to the drawings, the present invention is a bow and arrow hunting accessory device and is generally referred to with numeral 10.

As seen in FIG. 1, present invention 10 includes mounting post assembly 20, telescopic swivel bar assembly 70, and mounting arm assembly 100.

Figure 2:
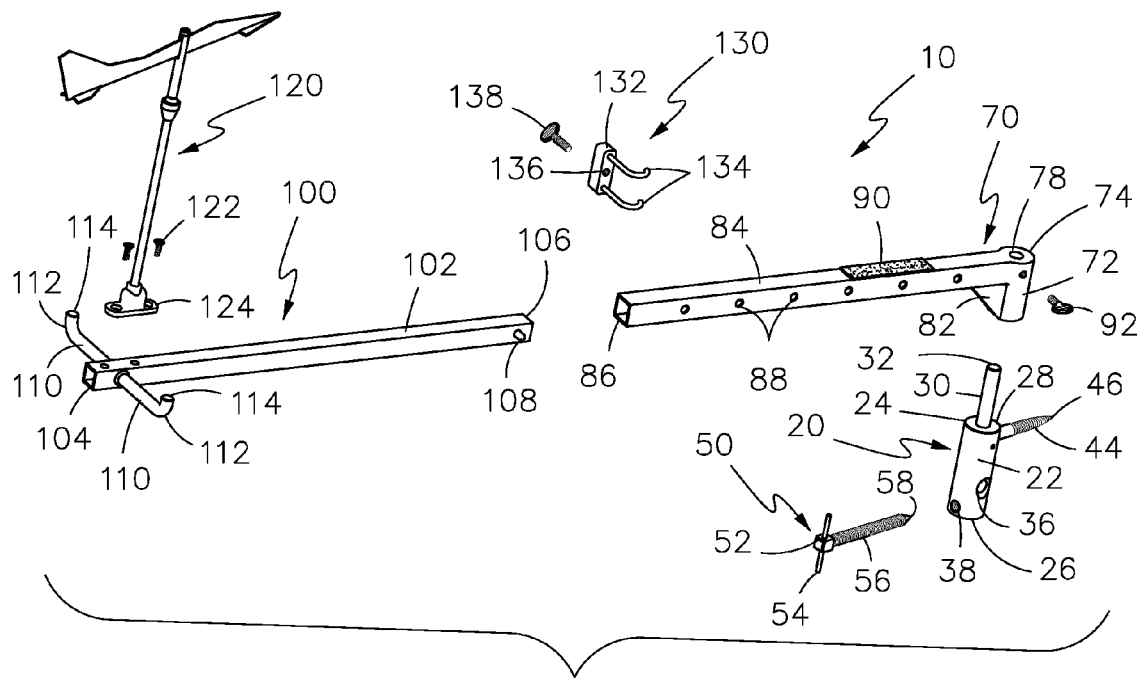
FIG. 2 is an exploded top isometric view of the present invention.
Figure 3:
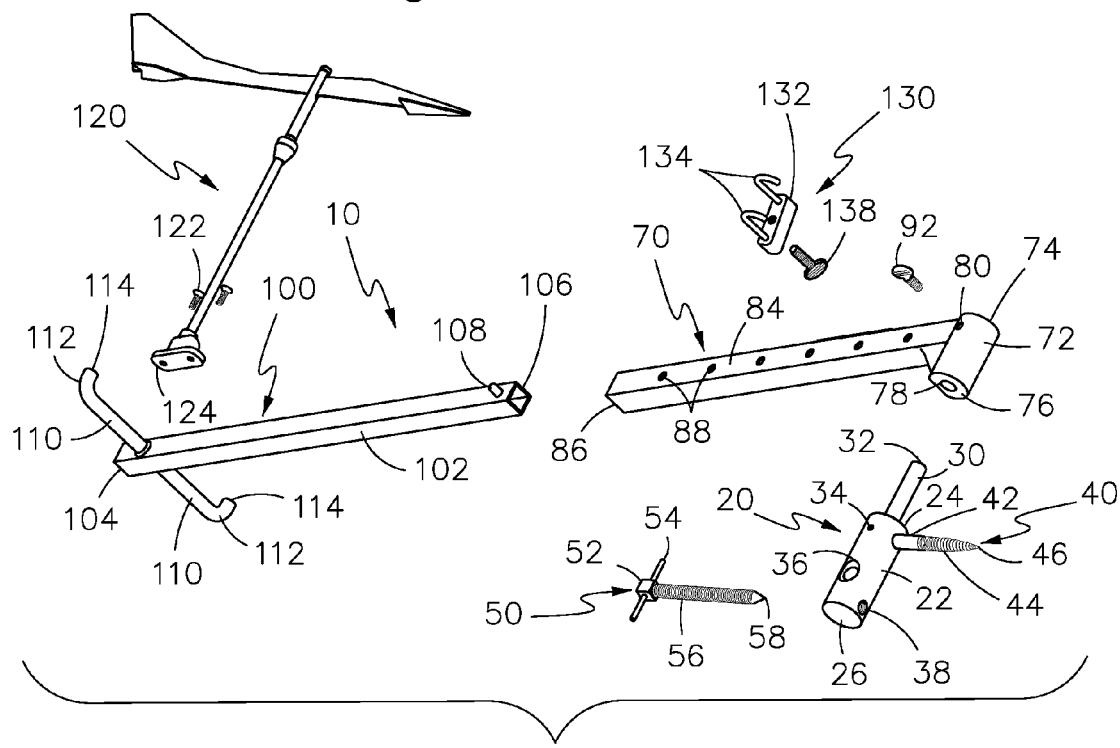
FIG. 3 is an exploded bottom isometric view of the present invention.

As seen in FIGS. 2 and 3, mounting post assembly 20 comprises sidewall 22 that extends between first and second ends 24 and 26. Mounting post assembly 20 further comprises top 28 at first end 24. Extending from top 28 is shaft 30 having shaft end 32. Sidewall 22 has set screw hole 34 that receives a set screw, not seen. Protruding perpendicularly from sidewall 22 is stationary mounting screw 40 that comprises shank 42, threaded section 44, and tip 46. Stationary mounting screw 40 remains stationary with the set screw. Sidewall 22 also has access hole 36 that may be used to temporarily receive a rod therethrough, not seen. The rod may be used as a lever when inserting stationary mounting screw 40 into a tree trunk. Sidewall 22 also has mounting screw hole 38 that extends perpendicularly through mounting post assembly 20 to receive mounting screw 50. Mounting screw 50 comprises head 52, handle 54, threaded section 56, and tip 58.

Telescopic swivel bar assembly 70 comprises housing 72 having top face 74, bottom face 76, hole 78, and thumb screw hole 80 that receives thumb screw 92. Hole 78 receives shaft 30 when telescopic swivel bar assembly 70 mounts onto mounting post assembly 20. Extending from housing 72 is elongated housing 84 supported by reinforced section 82. Elongated housing 84 extends to end 86, and in a preferred embodiment, comprises at least two extension holes 88. Elongated housing 84 may also comprise hook and loop fastener 90 to secure tools, accessories, and/or desired items thereon.

Mounting arm assembly 100 comprises mounting arm 102 having ends 104 and 106, and at least one accessory support arm 110. Each accessory support arm 110 comprises bend 112 and tip 114. In a preferred embodiment, mounting arm assembly 100 comprises first and second accessory support arms 110. Mounting arm 102 comprises actuating pin 108 at a predetermined distance from end 106. In a preferred embodiment, actuating pin 108 comprises a spring, not seen, having a spring force that may be overcome to insert end 106 into end 86, and slid therein, until actuating pin 108 pops out of an extension hole 88.

Mounting arm assembly 100 further comprises wind vane 120 comprising wind vane base 124 secured with screws 122 to mounting arm 102. In a preferred embodiment, wind vane 120 is mounted approximately perpendicularly to mounting arm assembly 100.

Present invention 10 further comprises clamp assembly 130 comprising clamp base 132. Extending from clamp base 132 are hooks 134. Clamp assembly 130 further comprises clamp base hole 136 to receive fastener 138.

Figure 4:
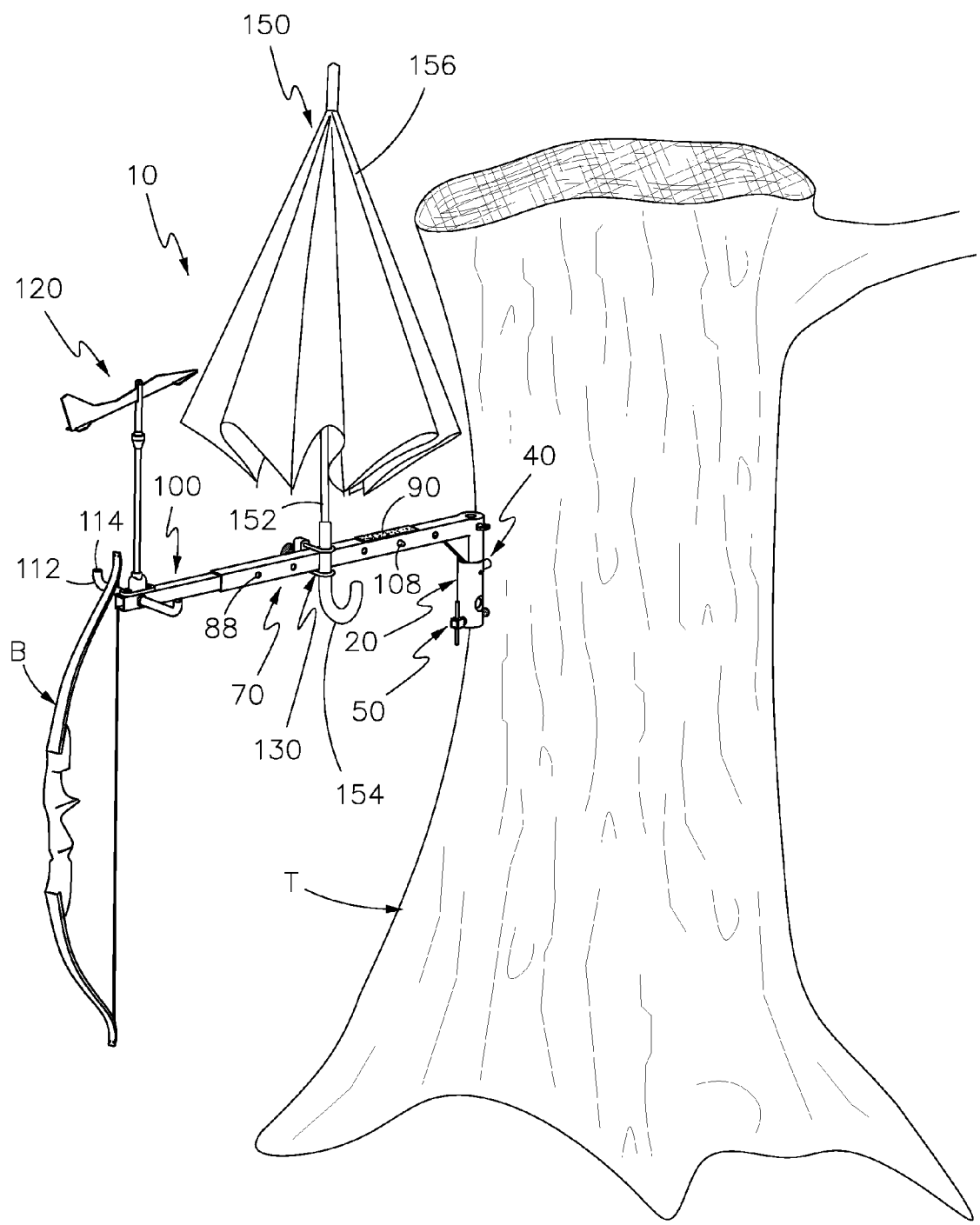
FIG. 4 is an isometric view of the present invention secured onto a tree.

As seen in FIG. 4, present invention 10 is secured onto tree T, whereby stationary mounting screw 40 is first inserted into tree T. Mounting screw 50 is then inserted through mounting screw hole 38 and into tree T. Telescopic swivel bar assembly 70 then mounts onto mounting post assembly 20, is placed at a desired angle, and then secured with thumb screw 92. It is noted that telescopic swivel bar assembly 70, together with mounting arm assembly 100, may mount onto mounting post assembly 20. Actuating pin 108 is positioned to a desired extension hole 88. Bow B is suspended onto an accessory support arm 110. Hooks 134 secure umbrella 150 having shaft 152, handle 154, and canopy 156 when biased against telescopic swivel bar assembly 70. In a preferred embodiment, fastener 138 is actuated to pull handle 154 against a sidewall of telescopic swivel bar assembly 70 to keep umbrella 150 secure.

Present invention 10 is removably mounted onto trees T, safely and conveniently keeps hunting equipment while hunting, protects a hunter from sun and/or rain with umbrella 150, improves shooting accuracy with use of wind vane 120, telescopically extends and retracts with actuating pin 108, may be adjusted and fixed at desired angles with thumb screw 92, and is volumetrically efficient for carrying, transporting, and storage.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bow and arrow hunting accessory device, comprising:
    A) a mounting post assembly comprising a sidewall, and first and second mounting screws, said first mounting screw extending from said sidewall and is stationary, and said sidewall extending between first and second ends, said mounting post assembly further comprising a top at said first end and a shaft that extends from said top;
    B) a swivel bar assembly comprising a housing having a hole, said hole receives said shaft when said swivel bar assembly mounts onto said mounting post assembly; and
    C) a mounting arm assembly comprising at least one accessory support arm; and D) a clamp assembly mounted on said swivel bar, said clamp assembly comprises a clamp base and at least two hooks extending therefrom, wherein the two hooks are biased against the swivel bar assembly.

2. The bow and arrow hunting accessory device set forth in claim 1, further characterized in that said swivel bar assembly comprises an elongated housing.

3. The bow and arrow hunting accessory device set forth in claim 2, further characterized in that said swivel bar assembly comprises at least two extension holes.

4. The bow and arrow hunting accessory device set forth in claim 3, further characterized in that said swivel bar assembly comprises a first end.

5. The bow and arrow hunting accessory device set forth in claim 4, further characterized in that said mounting arm assembly comprises a mounting arm having a second end.

6. The bow and arrow hunting accessory device set forth in claim 5, further characterized in that said mounting arm comprises at least one actuating pin.

7. The bow and arrow hunting accessory device set forth in claim 6, further characterized in that said elongated housing receives said mounting arm.

8. The bow and arrow hunting accessory device set forth in claim 7, further characterized in that each of said at least two extension holes receives said at least one actuating pin.

9. The bow and arrow hunting accessory device set forth in claim 7, further characterized in that said mounting arm assembly comprises a wind vane.

10. The bow and arrow hunting accessory device set forth in claim 9, further characterized in that said wind vane is mounted approximately perpendicularly to said mounting arm.

11. The bow and arrow hunting accessory device set forth in claim 1, further characterized in that said clamp assembly further comprises a clamp base hole to receive a fastener.

12. The bow and arrow hunting accessory device set forth in claim 11, further characterized in that said at least two hooks secure an umbrella when said at least two hooks are biased against said swivel bar assembly.

13. The bow and arrow hunting accessory device set forth in claim 1, further characterized in that said first and second mounting screws insert into a tree.

\* \* \* \* \*